(12) United States Patent
Freeman et al.

(10) Patent No.: US 10,720,173 B2
(45) Date of Patent: Jul. 21, 2020

(54) VOICE CAPTURE PROCESSING MODIFIED BY BACK END AUDIO PROCESSING STATE

(71) Applicant: BOSE CORPORATION, Framingham, MA (US)

(72) Inventors: Eric J. Freeman, Sutton, MA (US); Joseph Gaalaas, Woodbury, MN (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/901,148

(22) Filed: Feb. 21, 2018

(65) Prior Publication Data
US 2019/0259408 A1 Aug. 22, 2019

(51) Int. Cl.
| | | |
|---|---|---|
| *G10L 21/0232* | (2013.01) | |
| *G10L 21/0208* | (2013.01) | |
| *G10L 15/22* | (2006.01) | |
| *G10L 25/78* | (2013.01) | |
| *H04R 1/40* | (2006.01) | |
| *H04R 3/00* | (2006.01) | |

(52) U.S. Cl.
CPC .......... *G10L 21/0232* (2013.01); *G10L 15/22* (2013.01); *G10L 21/0208* (2013.01); *G10L 25/78* (2013.01); *H04R 1/406* (2013.01); *H04R 3/005* (2013.01); *G10L 2015/223* (2013.01); *G10L 2021/02082* (2013.01)

(58) Field of Classification Search
CPC ..... G10L 21/0232; G10L 25/78; G10L 15/22; G10L 2021/02082; G10L 2015/223; H04R 1/406; H04R 3/005
See application file for complete search history.

(56) References Cited

U.S. PATENT DOCUMENTS

| | | | | |
|---|---|---|---|---|
| 2009/0245527 A1* | 10/2009 | Kumar | ................... | H04B 3/234 381/66 |
| 2015/0154977 A1* | 6/2015 | Ekman | .................. | H04M 9/082 381/66 |
| 2018/0077290 A1* | 3/2018 | Zargar | ................ | G10L 21/0232 |

FOREIGN PATENT DOCUMENTS

EP        0988744 A2      3/2000

OTHER PUBLICATIONS

The IEEE Standard Dictionary of Electrical and Electronics Terms, Sixth Edition, p. 414. (Year: 1996).*
International Search Report and the Written Opinion of the International Searching Authority from corresponding PCT/US2019/018742 dated May 16, 2019.
Stenger, Alexander et al., "An Acoustic Echo Canceller with Compensation of Nonlinearities", University of Erlangen-Nuremberg, Telecommunications Institute, 9th European Signal Processing Conference, IEEE, pp. 1-4 (Sep. 8, 1998); Retrieved: Apr. 20, 2015.

(Continued)

*Primary Examiner* — Ping Lee
(74) *Attorney, Agent, or Firm* — Lando & Anastasi, LLP

(57) ABSTRACT

Audio systems and methods are provided that receive a playback signal and produce an acoustic signal based upon the playback signal, and include microphone signal(s) for capturing and processing user voice signals. An echo reference signal is based upon the playback signal, and an echo canceler reduces echo components from the microphone signal(s). Functionality of the echo canceler is modified, such as by freezing an adaptive filter, in response to a non-linear condition in the audio playback, or a likelihood of such a non-linear condition.

18 Claims, 4 Drawing Sheets

(56) References Cited

OTHER PUBLICATIONS

Birkett, A. N. et al., "Limitations of Handsfree Acoustic Echo Cancellers Due to Nonlinear Loudspeaker Distortion and Enclosure Vibration Effects", Carleton University, Department of Systems and Computer Engineering, IEEE ASSP Norkshop on New Paltz, NY, pp. 103-106 (Oct. 15, 1995); DOI: 10.1109/ASPAA.1995.482968.

\* cited by examiner

VOICE CAPTURE PROCESSING MODIFIED
BY BACK END AUDIO PROCESSING STATE

BACKGROUND

Audio systems sometimes include one or more acoustic transducers to convert acoustic signals into electrical signals (e.g., microphones) to detect acoustics in the environment in which they operate, and sometimes also include acoustic drivers (e.g., loudspeakers) to reproduce acoustic audio content from an electrical signal. Microphones may be deployed in such systems for the purpose of detecting desired audio, which may include a user's speech for applications such as automatic speech recognition, virtual personal assistants, and communications (e.g., telephone), for example. The microphone(s) may pick up components of the audio playback generated by the acoustic drivers, e.g., through acoustic reflections and/or acoustic coupling, etc., and this self-playback (echo) signal may interfere with the detection and/or processing of the desired signal, e.g., the user's speech. Echo cancellers having adaptive filters may be used to reduce or remove the echo signal components.

SUMMARY

Aspects and examples are directed to systems and methods that adjust or modify voice capture processing based on audio playback processing, such as non-linear conditions in playback of an audio program.

According to one aspect, an audio system is provided that includes a microphone to provide a microphone signal, an echo canceler configured to process the microphone signal to reduce echo components, based upon an echo reference signal, an audio input to receive a playback signal, a playback section configured to process the playback signal and to provide the echo reference signal based upon the playback signal, and to provide a driver signal, a transducer configured to convert the driver signal into an acoustic signal, and a processor configured to determine a non-linear condition in the playback section and to indicate the non-linear condition to the echo canceler.

In some examples, the echo canceler is configured to make an operational adjustment in response to the non-linear condition. In certain examples, the echo canceler is configured to freeze adaptation of an adaptive filter in response to the non-linear condition.

In certain examples, the playback section includes the processor.

In some examples, the processor is configured to indicate the non-linear condition to the echo canceler in the form of a flag. The echo canceler may be configured to freeze adaptation of an adaptive filter in response to receiving the flag.

Some examples include a detector to determine the non-linear condition. The processor may include the detector. The detector may be coupled to one or more of the transducer or the playback section to determine the non-linear condition, in some examples.

According to another aspect, an audio system is provided that includes a playback section including an audio input to receive a playback signal and a transducer to produce an acoustic signal based upon the playback signal, and configured to provide an echo reference signal based upon the playback signal, and an adaptive filter configured to receive the echo reference signal and to provide an estimated echo signal, the adaptive filter configured to freeze adaptation in response to a non-linear condition in the playback section, and an acoustic pickup section configured to receive a microphone signal and to subtract the estimated echo signal from the microphone signal to provide a pickup signal.

The acoustic pickup section may include a microphone to provide the microphone signal.

In certain examples, the acoustic pickup section includes a plurality of microphones and a beam processor, to provide the microphone signal.

According to some examples, the playback section may be configured to provide an indication of the non-linear condition. In certain examples, the playback section includes a detector to detect the non-linear condition. In some examples, the playback section is configured to provide the indication of the non-linear condition based upon a threshold likelihood of the non-linear condition.

Some examples further include a processor to receive the pickup signal. The processor may be configured to detect a spoken word in the pickup signal.

According to another aspect, a method of picking up a user's voice in an acoustic environment is provided. The method includes receiving a playback signal, producing an acoustic signal based on the playback signal, providing an echo reference signal based on the playback signal, filtering, by an adaptive filter, the echo reference signal to provide an estimated echo signal, determining a non-linear condition that may affect producing the acoustic signal, freezing an adaptation of the adaptive filter in response to determining the non-linear condition, receiving a microphone signal, and reducing echo content of the microphone signal based on the estimated echo signal, to provide a pickup signal.

In some examples, determining the non-linear condition may include determining that a likelihood of the non-linear condition meets a threshold. In certain examples, determining the non-linear condition includes determining that a signal level is being limited.

Certain examples include providing the pickup signal to a processor. In some examples, the processor may analyze the pickup signal to detect a spoken word. In certain examples, the processor may further analyze the pickup signal to detect a user command, and an algorithm may be executed in response to detecting the user command.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like numeral. For purposes of clarity, not every component may be labeled in every figure. In the figures.

DETAILED DESCRIPTION

Figure 1:
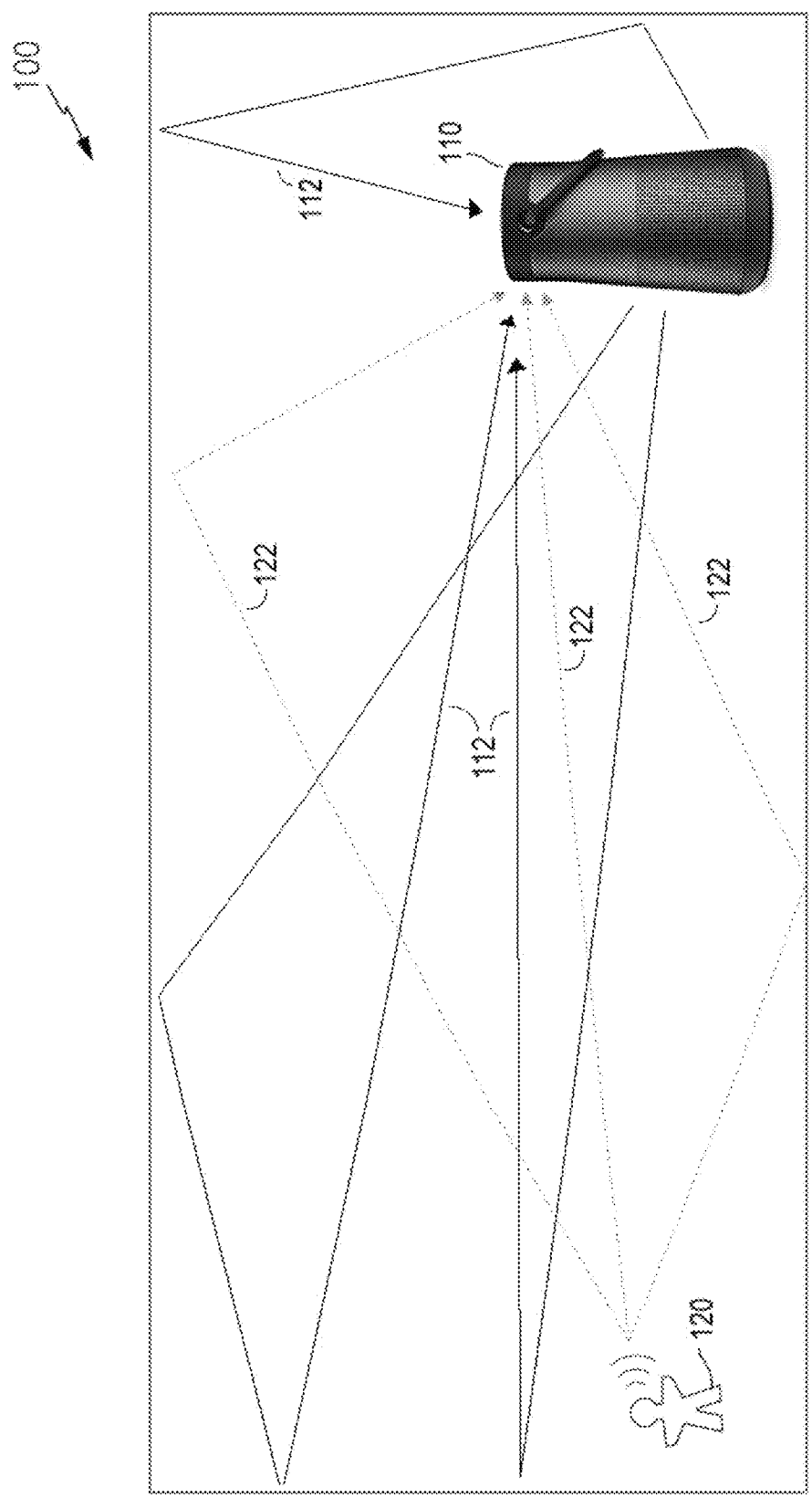
FIG. 1 is a schematic diagram of an example environment in which an example audio system may operate.

Aspects of the present disclosure are directed to audio speaker systems and methods that include one or more microphones to pick-up a desired signal, such as a voice signal of a user, while reducing or removing other signal components, such as self-playback (echo) from the speaker itself. Providing a user's voice signal with reduced echo components may enhance voice-based features or functions available as part of an audio system or other associated equipment, such as communications systems (cellular, radio, aviation), entertainment systems (gaming), speech recognition applications (speech-to-text, virtual personal assistants), and other systems and applications that process audio, especially speech or voice. Examples disclosed herein may be coupled to, or placed in connection with, other systems, through wired or wireless means, or may be independent of other systems or equipment.

The example audio systems and methods described herein may include multiple microphones that provide one or more signals to one or more echo cancellers, which may include adaptive filters, to suppress, reduce, or remove echo signals from an audio program being simultaneous played through the audio system. Operation of the adaptive filters (and supportive signal processing) may cause the audio system or method to adapt to the acoustic environment, on an on-going basis, to reduce echo signal components (e.g., due to acoustic reflections of the playback audio from the room or environment).

An echo canceller receives a reference signal representing the playback signal, known as an echo reference signal in some instances, and typically filters the reference signal through an adaptive filter to produce an estimated echo signal. The estimated echo signal may then be subtracted from a microphone signal to suppress, reduce, or remove an echo component in the microphone signal. The adaptive filter adapts to the environment, and ultimately converges to replicate a combined transfer function that may include the acoustic response of the speaker transducer(s), the room or environment, and the microphone(s). In some examples, the combined transfer function may include audio processing performed downstream from the reference signal.

Production of a signal wherein a user's voice components are enhanced while other components are reduced may be referred to generally herein as voice capture, voice pick-up, voice isolation, speech enhancement, and the like. As used herein, the terms "voice," "speech," "talk," and variations thereof are used interchangeably and without regard for whether such speech involves use of the vocal folds.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, right and left, top and bottom, upper and lower, and vertical and horizontal are intended for convenience of description, not to limit the present systems and methods or their components to any one positional or spatial orientation.

FIG. 1 illustrates an example environment 100 where an example audio system 110 may be in use. The environment 100 includes the audio system 110 and a user 120 whose speech may be captured by the audio system 110, e.g., to be detected and provided for further processing. The audio system 110 includes one or more associated speaker drivers (e.g., transducers) for the reproduction of audio playback signals, e.g., the conversion of an audio program (playback) signal into an acoustic signal. The audio system 110 also includes one or more microphones for detecting, or "picking up," acoustic signals from the environment 100, which may include speech from the user 120 and portions of the playback signal (e.g., direct and/or indirect coupling from the transducers). In various examples, the audio system 110 may have a single microphone or may have a plurality of microphones, which may be processed as an array in various examples, and may generally be referred to herein as a "microphone array," even if the system has only a single microphone and regardless of whether the system performs array processing. Likewise, the audio system 110 may have one or multiple transducers (speaker drivers) and/or playback channels, but are generally referred to herein in the singular, although a plurality is intended to be included.

The user 120 may produce acoustic signals 122, direct and reflected, when he or she speaks, which may reach the audio system 110 and be converted to electrical signals by the microphone array. The audio system 110 itself produces acoustic signals 112, and these may also reach the microphone array. Further, the transducer(s) of the audio system 110 that produce the acoustic signals 112 may also exhibit direct coupling, e.g., through an enclosure or chassis, or by virtue of proximity, to the microphone array. Accordingly, signals provided by the microphone array may have components of user speech and may have components of the playback audio, as well as other components (e.g., noise, other acoustic sources, etc.). The components associated with the playback audio are "self-playback" components, or echo components. The echo components are preferably suppressed, reduced, or removed from the microphone array signals by an echo canceller. Accordingly, a voice pickup output signal (e.g., a voice capture signal) provided by the audio system 110, may have significantly enhanced voice content relative to echo content, e.g., enhanced signal-to-noise ratio (SNR), due to reduction of signal components related to audio playback signal(s) being produced by the audio system 110.

Various examples of systems and methods in accord with those described herein may include one or more acoustic drivers for the production of acoustic signals from one or more playback signals. For example, an audio system 110 may include one or more loudspeakers in addition to multiple microphones, and receive a playback signal for playback as an acoustic signal. Examples include, but are not limited to, a speakerphone system, a portable speaker, a virtual assistant device, a soundbar, etc., and may be coupled via a wireless connection, e.g., Bluetooth™ or wi-fi, or a wired connection, e.g., optical, coaxial, Ethernet, using any of various protocols and/or signal formats, to audio signal sources, such as a smartphone, a television, a remote server, or the like.

Figure 2:
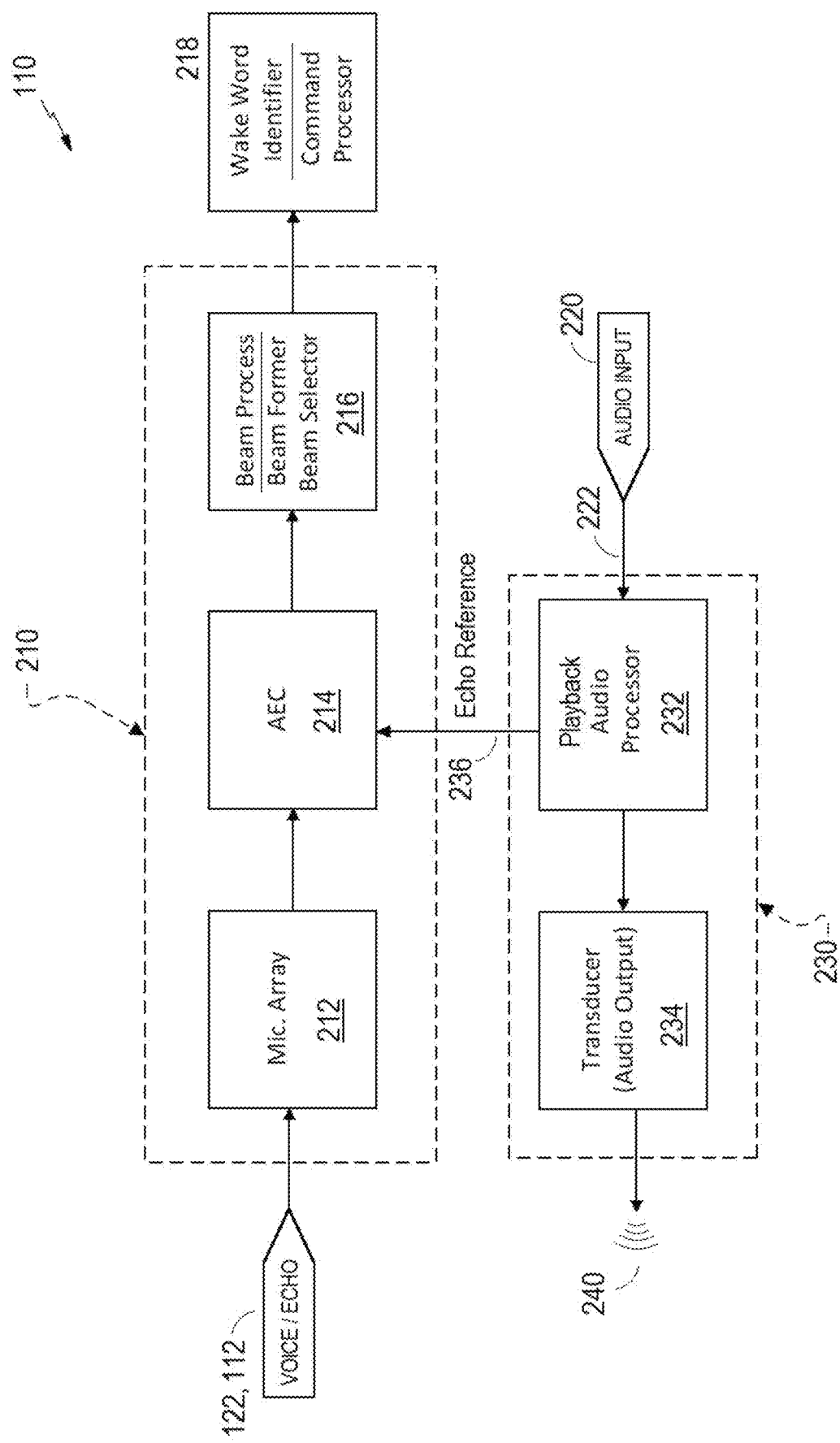
FIG. 2 is a schematic block diagram of an example audio system.

Referring to FIG. 2, an example audio system 110 is shown and includes a voice capture section 210 to process signals detected by a microphone array 212, an audio input 220 to receive a playback signal 222, and a playback section 230.

The playback section 230 receives the playback signal 222 (e.g., from an audio source coupled to the audio input 220) and may perform various processing of the playback signal 222 (e.g., by playback processor 232), such as equalization, limiting, etc., and ultimately provides an amplified signal to a transducer 234, which is an acoustic driver, to produce an acoustic output 240.

The voice capture section 210 includes the microphone array 212 which picks up various acoustic signals from the environment 100 (see FIG. 1) as well as from the chassis or enclosure of the audio system 110, such as internal acoustics, reverberation, vibration, e.g., direct coupling. Accordingly, signals provided by the microphone array 212 may include components related to the playback signal 222 (e.g., via coupling and acoustic echo, together generally referred to herein as echo), speech of the user 120 (see FIG. 1), and other acoustic sources. The signals provided by the microphone array 212 are therefore processed by an echo canceller 214 (e.g., acoustic/active echo cancellation, AEC) to suppress, reduce, or remove the echo component. The echo canceller 214 may receive one or more echo reference signal(s) 236 from the playback section 230. The echo canceller 214 operates to reduce signal components (from the microphone array 212) that are correlated to the echo reference signal 236, and may use one or more adaptive filters to do so.

For example, the echo reference signal 236 may be a copy of a signal provided to the transducer 240 (before or after amplification), and is therefore representative of (e.g., correlated to) the acoustic output 240. Echo components picked up by the microphone array 212 are also correlated to the acoustic output 240. Accordingly, the echo reference signal 236 is representative (e.g., correlated to) the echo components picked up by the microphone array 212. The echo canceller 214 may adaptively filter the echo reference signal 236 to produce an estimate of the echo components, known as an estimated echo signal, and then subtract the estimated echo signal from the signals provided by the microphone array 212. An adaptive filter may adapt using any of a number of algorithms known in the art, to adjust filter coefficients in an effort to optimize an amount of echo reduction achieved. The adapted filter coefficients, especially when converged to a set of substantially steady or fixed coefficients, effectively model the acoustic response of the environment 100 to the output of the transducer 234 (e.g., including coupling in the audio system 110 and reflective acoustics of the environment 100, each of which may depend upon placement of the audio system 110 in the environment 100). Adaptive filters such as those described herein are generally linear filters and exhibit enhanced performance when there is a linear relationship between the echo reference signal(s) 236 and the echo component(s) of the signals provided by the microphone array 212. Accordingly, any non-linear effect downstream (relative to the playback signal path) from where the echo reference signal 236 is provided to the echo canceller 214 may cause divergence of the filter coefficients of an adaptive filter, resulting in diminished performance of the echo canceller 214.

The voice capture section 210 may also include beam processing 216, such as beam forming functionality (array weights/coefficients, delay and sum processing, etc.) to increase or decrease an acoustic response of the microphone array in one direction or another. Such array processing may include beam selection, wherein a number of pre-configured beam patterns (e.g., acoustic response patterns) are stored in memory and are selected among to enhance or optimize the user's speech component of the microphone array. Beam forming and beam selection may operate together to enhance acoustic response of the microphone array in the direction of the user, if possible. In various examples, one or more functions of beam processing 216 may be performed on signals from the microphone array 212 prior to processing by the echo canceller 214. In other examples, beam processing 216 may be omitted. The voice capture section 210 ultimately provides a signal for voice processing 218 for various voice processing, such as identification/recognition of a wake-up word and/or voice recognition and processing of commands spoken by the user 120

Figure 3:
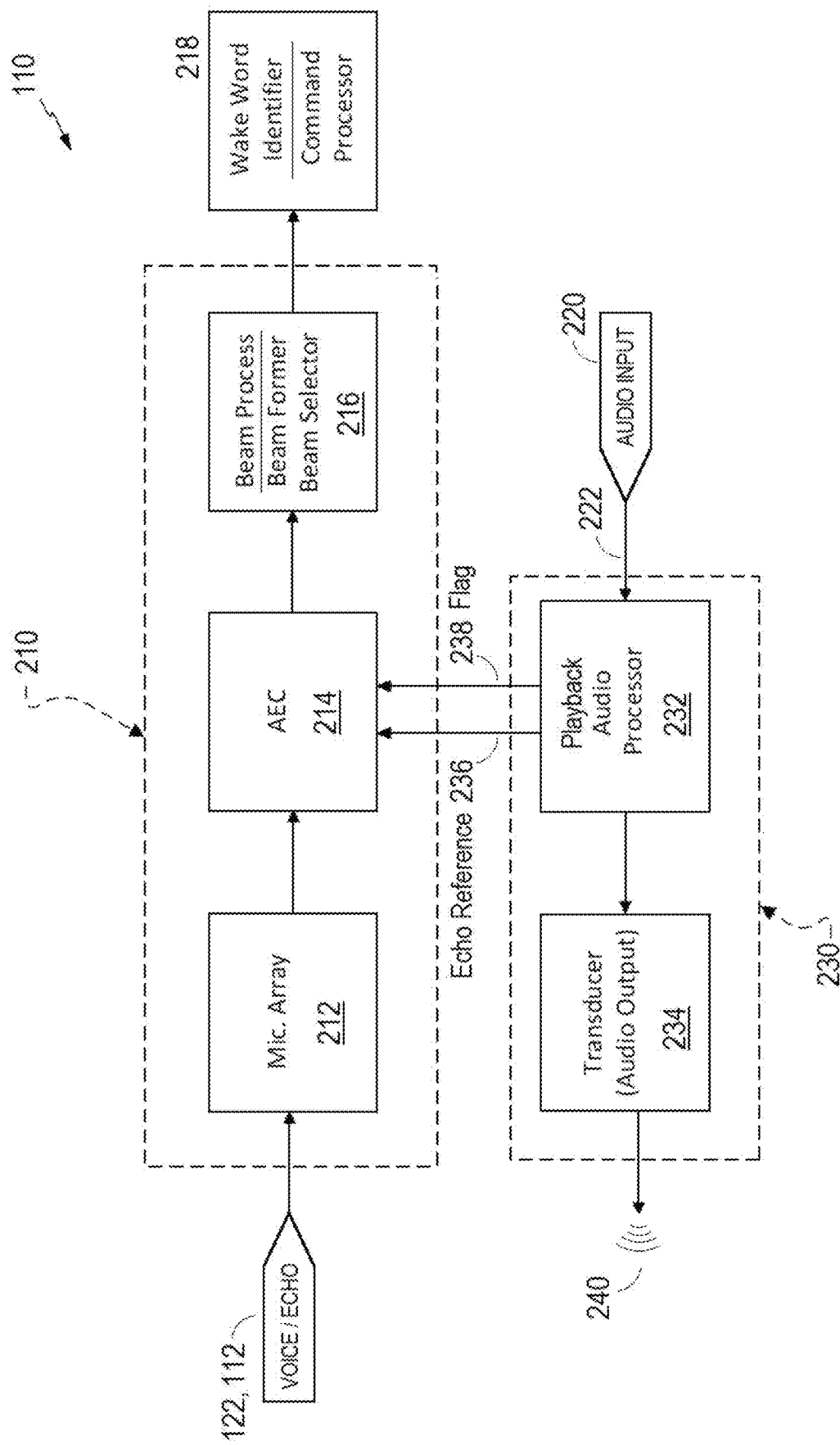
FIG. 3 is a schematic block diagram of an example audio system that modifies voice capture processing based on audio playback processing.

In various examples, the various processing performed by the echo canceller 214, beam processing 216, voice processing 218, and playback processor 232 may be performed by a single processor or controller, or various processing functions may be distributed across processors. No particular division of processing functionality across hardware processing platforms is intended to be implied by the block diagram of FIGS. 2-3. In some examples, playback processing 232, echo cancelling 214, and beam processing 216 may be performed by one or more digital signal processors while voice recognition and command processing (e.g., voice processing 218) may be performed by a more generic form of processor.

As described above, non-linear effects downstream from where the echo reference signal 236 is provided to the echo canceller 214 may cause divergence of adaptive filter coefficients and therefore diminished performance of the echo canceller 214. Accordingly, it is desirable to detect or predict when non-linear effects are present or likely, and freeze adaptation of the filter coefficients until the non-linear effects subside. Accordingly, and with reference to FIG. 3, a further example audio system 100 is shown, similar to that of FIG. 2, having at least one additional input to the echo canceller 214 from the playback section 230. The additional input is a flag 238 which is an indicator to the echo canceller 214 that a non-linear condition is or may be present, and the echo canceller 214 should freeze the coefficients (e.g., stop the adaptation) of one or more adaptive filters to avoid divergence of the filter coefficients.

Any number of non-linear effects may create the possibility of decreased performance of echo cancellation due to divergence of various adaptive filters. Additionally, the playback section 230 may be aware of a non-linear condition, or the likelihood of a non-linear condition, in various ways. Accordingly, any of various bases for indicating a non-linear condition or likelihood is intended to be in keeping with various examples described herein. Likewise, any of various bases for notifying an echo canceller 214 to pause or freeze adaptation of an adaptive filter, to prevent divergence of the adaptive filter that may be caused at least in part upon processing or other effects on the playback signal path in the playback section 230, is intended to be in keeping with various examples described herein.

Various examples of non-linear effects that may be known, knowable, or predictable to the playback section are described herein, without limitation. Playback volume may approach a region where the transducer 234 is known to exhibit non-linear characteristics. In that all transducers exhibit some non-linearity, a threshold may be applied as to when such non-linear characteristic may cause divergence of an adaptive filter, in various examples. Various signal processing and/or amplification stages may reduce or clip a signal amplitude to limit excursion of a movable component of a transducer, e.g., to avoid overdriving the transducer or reaching an excursion limit, and if such is applied downstream of the echo reference signal 236 it may create a non-linear transfer function between the echo reference signal 236 and the echo component provided by microphone array 212. Such a processor or amplifier may indicate, e.g., to the playback processor 232, that such a functionality is enabled or active. Certain transducer operation and/or signal characteristics may produce a high level (non-linear) of port noise (e.g., a bass reflex port). Passive radiators and air volumes within the audio system 110 may cause non-linear operation. A low supply voltage may cause a non-linear condition.

Figure 4:
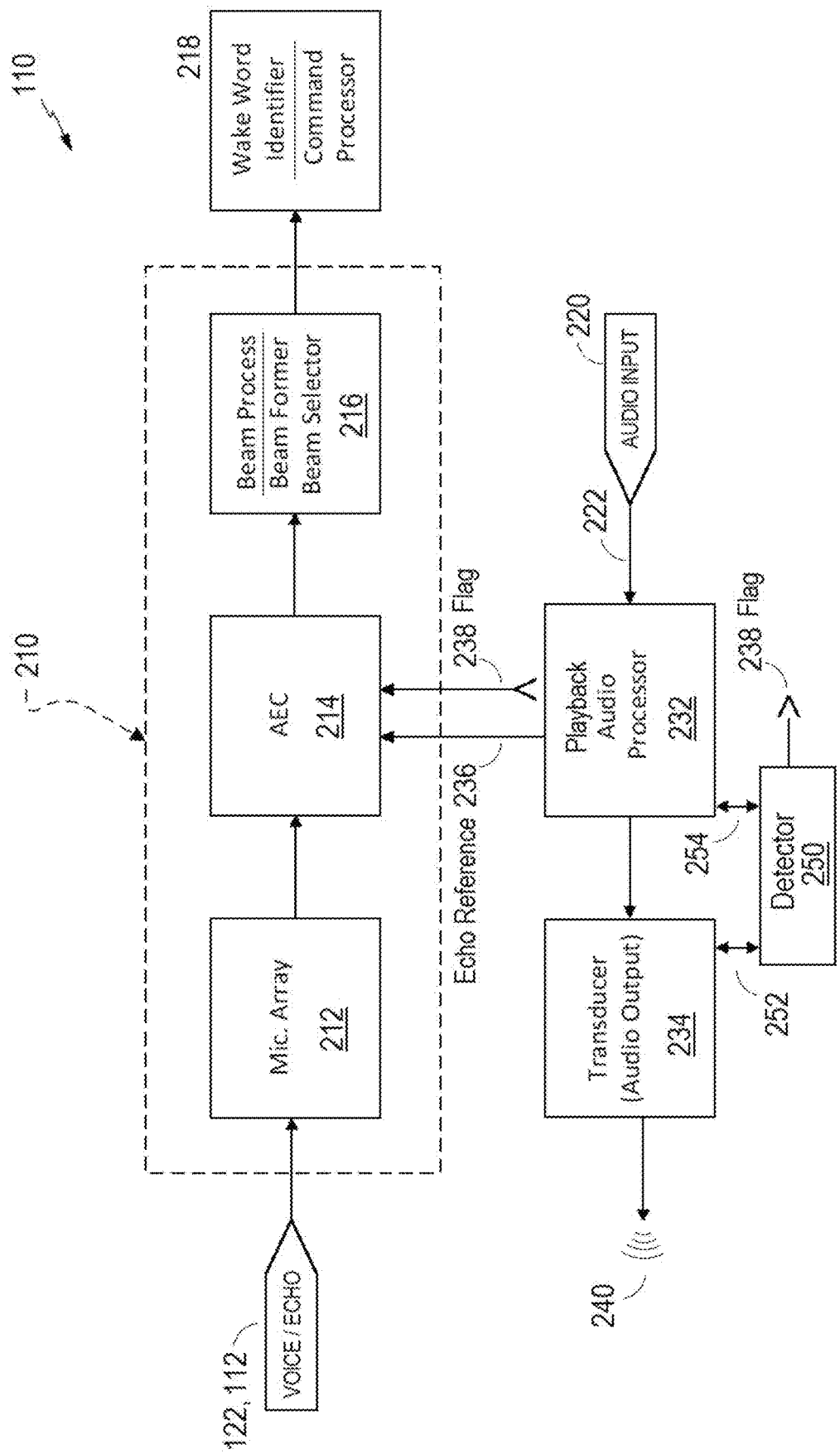
FIG. 4 is a schematic block diagram of another example audio system that modifies voice capture processing based on audio playback processing.

In some examples, additional detectors may be provided to detect a non-linear condition, e.g., detect particle velocity to detect port noise or detect voltage and current provided to the transducer (and compared with known linear operation) to determine non-linear operation of the transducer. One or more microphones (that may contribute to the microphone array 212) may exhibit non-linearity at certain sound pressure levels, for instance, and may also be a source of non-linear condition. For example, with reference to FIG. 4, a detector 250 may be included that may determine and provide the flag 238. In some examples, the detector 250 may include an interface 252 to the transducer 234, such as to detect current and/or voltage provided to the transducer 234, and thereby detect non-linear operation of the transducer 234. Some examples may include an interface 254 to one or more processing components, such as the playback processor 232, from which the detector 250 may detect non-linear processing and/or the processing component may indicate or communicate when it includes some non-linear processing.

Some examples may include feed-forward modeling of system acoustics, e.g., from the playback signal 222 through to the acoustic output 240 (or any portion thereof), to detect (or predict) a non-linear condition (or the likelihood thereof). Such system modeling may be a detector and/or may receive inputs from additional detectors.

Any of the above non-linear conditions may occur in a particular frequency range and/or a particular sub-band. Accordingly, a flag 238 to provide an indication of a non-linear condition or the likelihood of a non-linear condition, or an indication that an adaptive filter should be frozen due to playback conditions, may be based upon a particular frequency range and/or a particular sub-band. Accordingly, in various examples, multiple such flags 238 may exist, e.g., for each of multiple frequency bands, multiple sub-bands, multiple independent adaptive filters, and/or multiple independent conditions, as suitable for any particular application.

In various examples, the playback section 230 of an audio system 110 may tested, monitored, modeled, or otherwise characterized to establish various sets of operational parameters in which the playback section 230 exhibits non-linear operation or conditions, and such ranges of operating parameters may be stored in a memory, and the flag 238 may provide indication of a non-linear condition or its likelihood when the audio system 110 is operated within such parameter ranges.

In various examples, a flag 238 to provide an indication of a non-linear condition or the likelihood of a non-linear condition may additionally or alternatively be used to temporarily disable detection of a wake word or disable voice recognition or command processing. The indication of a non-linear condition or its likelihood may be applied as an indication that signal output from the voice capture section 210 may be unreliable, and should not be processed, in some examples.

Further in various examples, a flag 238 may be an indication of a non-linear condition (or the likelihood of such) and may be applied to adjust battery usage, reduce overall system volume, or perform other operation(s) to reduce or compensate for the non-linearity.

Various examples of the systems and methods in accord with those described herein may include variations to operation, components, and features based upon application or environment. For example, an audio system designed for portable use may include an option to operate from battery power at times, and the number of microphones, adaptive channels, adaptive filters, sub-bands, sampling frequency, and the like, may be selected or may be adapted to reduce power consumption in certain examples. In some examples, tradeoffs to reduce power consumption may be made on the fly by the system, and may include trading off performance in terms of echo reduction for an extended operating time (e.g., battery life). Such options may be configurable by the user in certain examples. Additionally, such options may be changed over time, e.g., as a battery charge level reduces below one or more thresholds, for example. An audio system expected to be used in a more fixed environment, such as a home or office speaker that may be plugged in and may be expected to remain in a fixed position for an extended period of time, may be designed for more robust operation at the expense of increased power consumption, for instance, at least in part due to the expected reliability and sufficiency of power from, e.g., an electric grid. In such cases, the system may use more microphones, adaptive channels, more adaptive filters (perhaps with higher resolution), higher sampling frequency, more sub-bands, etc., to provide more robust performance without concern for power consumption. Some examples may incorporate expected knowledge regarding the acoustic environment. For example, a portable system may be expected to perform in a more widely varying and/or changing acoustic environment while a non-portable (though moveable) system may be expected to operate among a more limited set of conditions that may not change much over time. Accordingly, a non-portable system may maintain or store adapted filter weights, e.g., when powered off, to use again at the next power-on event. A portable system may not benefit from storing previously converged filter weights because there may be no expectation that it will be turned on in the same acoustic environment as it was previously operated. A portable system operating on battery power may be more likely to be outside, with few reflected or reverberant signals, whereas a non-portable system may be expected to be inside, with walls nearby, having relatively strong echo signals from multiple directions. Accordingly, in various examples, various configurations including operational parameters, power consumption, processing resources, memory, etc. may be selected or chosen based upon one or more expected use scenarios and/or expected acoustic environments.

One or more of the above described systems and methods, in various examples and combinations, may be used to capture the voice of a user and isolate or enhance the user's voice relative to self-playback echo signals. Any of the systems and methods described, and variations thereof, may be implemented with varying levels of reliability based on, e.g., microphone quality, microphone placement, acoustic ports, structural or device frame design, threshold values, selection of adaptive, spectral, and other algorithms, weighting factors, window sizes, filter resolutions, sub-band frequency widths, etc., as well as other criteria that may accommodate varying applications and operational parameters.

It should be understood that many of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), micro-controller(s), and the like, or any combination of these, may be suitable, and may include analog or digital circuit components and/or other components with respect to any particular implementation Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains. Further, processing may occur on a limited bandwidth (e.g., voice/speech frequency range) and/or may operate on a per sub-band basis.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, microphone, driver, or loudspeaker, may be any of many types of transducers known in the art. For example, an acoustic structure coupled to a coil positioned in a magnetic field, to cause electrical signals in response to motion, or to cause motion in response to electrical signals, may be a suitable acoustic transducer. Additionally, a piezoelectric material may respond in manners to convert acoustical signals to electrical signals, and the reverse, and may be a suitable acoustic transducer. Further, micro-electrical mechanical systems (MEMS) may be employed as, or be a component for, a suitable acoustic transducer. Any of these or other forms of acoustic transducers may be suitable and included in various examples.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An audio system, comprising:
    a microphone to provide a microphone signal;
    an echo canceller configured to process the microphone signal based upon an echo reference signal to reduce echo components;
    an audio input to receive a playback signal;
    a playback section having a processor configured to perform non-linear processing on the playback signal, to provide to the echo canceller a notification that the non-linear processing is enabled by the playback section, and to provide the echo reference signal based upon the playback signal, the playback section further configured to provide a driver signal; and
    a transducer configured to convert the driver signal into an acoustic signal;
    wherein the notification comprises a plurality of flags sent by the playback section to the echo canceller, wherein each flag in the plurality of flags corresponds to a respective frequency band in a plurality of frequency bands.

2. The audio system of claim 1 wherein the echo canceller is configured to make an operational adjustment in response to the non-linear condition.

3. The audio system of claim 1 wherein the echo canceller is configured to freeze adaptation of an adaptive filter in response to the non-linear condition.

4. The audio system of claim 1 wherein the echo canceller is configured to freeze adaptation of an adaptive filter in response to receiving the flags.

5. The audio system of claim 1 wherein the processor includes a detector coupled to at least one of the transducer or the playback section to determine the non-linear condition.

6. The audio system of claim 1, wherein each flag in the plurality of flags corresponds to a respective adaptive filter in a plurality of adaptive filters.

7. The audio system of claim 1, wherein each flag in the plurality of flags corresponds to a respective non-linear condition in a plurality of non-linear conditions.

8. A method of picking up a user's voice in an acoustic environment, the method comprising:
    receiving a playback signal;
    producing an acoustic signal based on the playback signal;
    providing an echo reference signal based on the playback signal;
    filtering, by an adaptive filter, the echo reference signal to provide an estimated echo signal;
    performing, by a playback section of an audio system, non-linear processing on the playback signal;

providing, by the playback section, a notification that non-linear processing of the playback signal is enabled, wherein the notification comprises a plurality of flags sent by the playback section, wherein each flag in the plurality of flags corresponds to a respective frequency band in a plurality of frequency bands;

freezing an adaptation of the adaptive filter in response to the notification of the non-linear processing;

receiving a microphone signal; and reducing echo content of the microphone signal based on the estimated echo signal, to provide a pickup signal.

9. The method of claim 8 wherein determining a non-linear condition includes determining that a likelihood of the non-linear condition meets a threshold.

10. The method of claim 8 wherein providing the indication of the non-linear condition includes providing an indication that a signal level is being limited.

11. The method of claim 8 further comprising providing the pickup signal to a processor.

12. The method of claim 11 further comprising analyzing the pickup signal, by the processor, to detect a spoken word.

13. The method of claim 12 further comprising, in response to detecting the spoken word, analyzing the pickup signal, by the processor, to detect a user command and executing an algorithm in response to detecting the user command.

14. An audio system, comprising:
a microphone to provide a microphone signal;
an echo canceller configured to process the microphone signal based upon an echo reference signal to reduce echo components;
an audio input to receive a playback signal;
a playback section having a processor configured to perform non-linear processing on the playback signal, to provide to the echo canceller a notification that the non-linear processing is enabled by the playback section, and to provide the echo reference signal based upon the playback signal, the playback section further configured to provide a driver signal; and
a transducer configured to convert the driver signal into an acoustic signal;
wherein the notification comprises a plurality of flags sent by the playback section to the echo canceller, wherein each flag in the plurality of flags corresponds to a respective adaptive filter in a plurality of adaptive filters.

15. The audio system of claim 14 wherein the echo canceller is configured to make an operational adjustment in response to the non-linear condition.

16. The audio system of claim 14 wherein the echo canceller is configured to freeze adaptation of an adaptive filter that has received the corresponding flag in response to the non-linear condition.

17. The audio system of claim 14 wherein the echo canceller is configured to freeze adaptation of an adaptive filter in response to receiving the corresponding flag.

18. The audio system of claim 14 wherein the processor includes a detector coupled to at least one of the transducer or the playback section to determine the non-linear condition.

* * * * *